United States Patent [19]
Carlson

[11] 3,976,722

[45] Aug. 24, 1976

[54] POLYMER COMPOSITIONS CONTAINING ADDUCT OF HEXAHALOCYCLOPENTADIENE AND BICYCLONONADIENE

[75] Inventor: Richard D. Carlson, Grand Island, N.Y.

[73] Assignee: Hooker Chemicals & Plastics Corporation, Niagara Falls, N.Y.

[22] Filed: May 27, 1975

[21] Appl. No.: 581,008

Related U.S. Application Data

[63] Continuation of Ser. No. 490,146, July 22, 1974, abandoned.

[52] U.S. Cl. .................. 260/880 R; 260/45.7 R; 260/45.75 B
[51] Int. Cl.$^2$............................................. C08J 3/20
[58] Field of Search ............... 260/45.75 B, 45.7 R, 260/648, 880 R

[56] References Cited
UNITED STATES PATENTS

| | | | |
|---|---|---|---|
| 3,403,036 | 9/1968 | Hindersinn et al. | 260/45.75 |
| 3,456,022 | 7/1969 | Wright | 260/648 |
| 3,806,492 | 4/1974 | Dombro | 260/45.75 |
| 3,809,725 | 5/1974 | Davenport | 260/45.75 |
| 3,828,003 | 8/1974 | Yamazi et al. | 260/45.75 |

*Primary Examiner*—V.P. Hoke
*Attorney, Agent, or Firm*—Peter F. Casella; James F. Mudd

[57] ABSTRACT

Polymeric materials are rendered fire retardant by incorporating therein a Diels-Alder adduct of a halogenated cyclopentadiene and bicyclononadiene. The fire retardance of the compositions can be further enhanced by the incorporation therein of a metallic compound, particularly a compound of antimony, arsenic or bismuth. A preferred metallic compound is antimony oxide.

10 Claims, No Drawings

POLYMER COMPOSITIONS CONTAINING ADDUCT OF HEXAHALOCYCLOPENTADIENE AND BICYCLONONADIENE

This is a continuation of application Ser. No. 490,146, filed July 22, 1974 now abandoned.

BACKGROUND OF THE INVENTION

U.S. Pat. No. 3,403,036, describes polymer compositions containing as fire retarding agents, Diels-Alder adducts of a halogenated cyclopentadiene and polyunsaturated cycloaliphatic compounds. Adducts disclosed by the patentees are the diadducts of 1,5-cyclooctadiene, dicyclopentadiene, cyclopentadiene and bicycloheptadiene.

It has now been found that the diadducts of halogenated cyclopentadienes and the compound bicyclononadiene exhibit unexpectedly superior properties in certain polymer applications. The superior properties include fire retardant efficiency and lower afterglow, and the polymer compositions have improved heat deflection properties and tensile and flexural properties over similar polymer compositions containing the Diels-Alder diadducts known in the art as fire retardant additives.

SUMMARY OF THE INVENTION

Fire retardant polymeric compositions are provided which comprise a polymer which is free of recurring carbonamide groups as an integral part of the main polymer chain and an effective fire retardant proportion of the Diels-Alder diadducts of a halogenated cyclopentadiene and bicyclononadiene. The compounds of the invention have the formula:

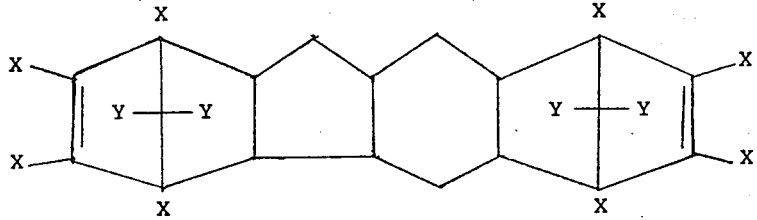

wherein X is selected from the group consisting of bromine, chlorine, and fluorine, Y is selected from the group consisting of bromine, chlorine, fluorine, alkyl of 1 to 10 carbon atoms, alkyloxy wherein the alkyl group contains 1 to 10 carbon atoms, haloalkyl and haloalkyloxy wherein the alkyl groups contain 1 to 10 carbon atoms and halo is fluoro, chloro, or bromo.

The preferred fire retardant additive compound of the invention is the Diels-Alder diadduct of hexachlorocyclopentadiene and bicyclo(4.3.0)nona-3,7-diene. The chemical name for the compound is 1,2,3,4,6,7,8,9,12,12,13,13-dodecachloro-1,4,4a,4b,5,5a,6,9,9a,10,10a,11a-dodecahydro-1,4:6,9-dimethano-11 H-benzo(b) fluorene.

DESCRIPTION OF THE EMBODIMENTS

The additive compounds of the invention are prepared by reacting bicyclononadiene with halogenated cyclopentadienes of the formula:

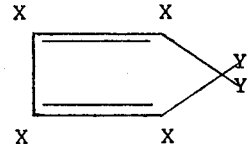

wherein X and Y are as defined above. The diadduct of bicyclononadiene and hexachlorocyclopentadiene is disclosed at *J. Gen. Chem.* of the U.S.S.R. 29 page 3552 (1959).

Halogenated cyclopentadienes suitable for use in the preparation of the adducts described above include hexahalocyclopentadienes, such as hexachlorocyclopentadiene, hexafluorocyclopentadiene and hexabromocyclopentadiene, monoalkyl-pentahalocyclopentadienes, such as 1-methyl-pentachlorocyclopentadiene, 1-ethyl pentabromocyclopentadiene, 1-hexyl pentafluorocyclopentadiene, 1-decyl pentachlorocyclopentadiene; dialkyltetrahalocyclopentadienes such as 1,1-dimethyl tetrachlorocyclopentadiene, 1,1-dibutyl-tetrachlorocyclopentadiene, 1-methyl, 1-hexyltetrabromocyclopentadiene, 1,1-dinonyl-tetrafluorocyclopentadiene, 1,1-didecyl tetrachlorocyclopentadiene; alkoxy halocyclopentadienes such as 1-methoxy-pentachloro and 1,1-dimethoxy tetrachlorocyclopentadiene, 1-hexoxy pentabromo-, and 1-hexoxy, 1-octoxy tetrabromocyclopentadiene, 1-decoxy-pentachloro- and 1,1-didecoxy-tetrachlorocyclopentadiene, 1-ethoxy-pentafluoro- and 1-ethoxy, 1-butoxy-tetrafluorocyclopentadiene; monohaloalkyl halocyclopentadienes such as 1-chloromethylpentachlorocyclopentadiene, 1,1-bis (chloro-methyl) tetrachlorocyclopentadiene, 1-bromoethylpentabromocyclopentadiene, 1,1-bis(bromohexyl) tetrachlorocyclopentadiene, 1-fluorodecyl pentafluorocyclopentadiene, 1,1-bis-(fluorodecyl) tetrafluorocyclopentadiene, 1-chloromethyl, 1-bromopropyl tetrabromocyclopentadiene. The preferred halocyclopentadiene is hexachlorocyclopentadiene.

The adduction step is preferably in liquid phase reaction. Although the reactants may be combined directly, the reaction is preferably carried out in the presence of a solvent.

The solvent can be an excess amount, over the stoichiometrical proportion, of the halocyclopentadiene reactant or a solvent which is inert to the reactants and the reaction product may be used. Preferably, the solvent should boil above about 90° Celsuis. Suitable nonreactive solvents include toluene, xylene, nitrobenzene, methylcyclohexane, perchloroethylene, acetylene tetrachloride and the like.

The temperature employed in the adduction step can range from about 75° Centigrade to about 200° Centigrade, although temperatures outside this range can be used. Preferably, the adduction reaction is effected at about 85° to about 170° Centigrade. The time required for the adduction to go essentially to completion may vary according to the reactivity of the halocyclopentadiene, the presence or absence of solvent, the temperature of the reaction, etc. Generally, a reaction period between about 5 and 100 hours will suffice, but preferably from about 10 to 48 hours.

The reaction is preferably and conveniently carried out under atmospheric pressure conditions although superatmospheric pressures may be used, and on occasion may be preferred, especially when one of the reactants is of low reactivity and/or high volatility. Generally, when superatmospheric pressure is used, autogeneous pressure will suffice although pressures of from 1.1 atmospheres to 100 atmospheres or more can be used.

The polymers which are free of recurring carbonamides groups as an integral part of the main polymer chain embraced within the scope of this invention include the homopolymers and copolymers of unsaturated aliphatic, alicyclic and aromatic hydrocarbons. Suitable monomers are ethylene; propylene; butene; pentene; hexene; heptene; octene; 2-methylpropene-1; 3-methylbutene-1; 4-methylpentene-1; 4-methylhexene-1; 5-methylhexene-1; bicyclo-(2.2.1)-2-heptene; butadiene; pentadiene; hexadiene; isoprene; 2,3-dimethylbutadiene-1,3; 2-methyl-1,3-pentadiene; 4-vinylcyclohexene; vinylcyclohexene; cyclopentadiene; styrene and methylstyrene, and the like. Polypropylene, ABS polymers, polystyrene and high impact or rubber-modified polystyrene are especially useful polymers. High impact polystyrene is a heterophase polymer with a rubbery polymer dispersed as small globules in a continuous matrix of polystyrene. The amount of rubber present by volume may be as low as 10 to 15 percent in medium impact grades and range as high as 40 percent in extra high impact types. The rubbery polymer used with the polystyrene is usually an elastomer with residual unsaturation, for instance, polybutadiene or a styrene-butadiene rubber. These toughened grades of polystyrene can be made by mechanical mixing of the rubber and the polystyrene on a two-roll mill or extruder. Common manufacturing techniques involve solution-graft polymerization processes although some special grades are made by blending polybutadiene latex or mechanical mixing with the polystyrene which can be made by the processes of mass, suspension, solution, ionic, or emulsion polymerization. The graft polymerization process starts with dissolving the rubber in styrene monomer, the rubber solution is then fed to the polymerization vessels. Other polymers useful in the practice of the invention are disclosed in U.S. Pat. No. 3,403,036, the disclosure of which is incorporated herein by reference.

The polymers of the invention can be in various physical forms, such as shaped articles, for example, molding, sheets, rods and the like; fibers, coatings, films and fabrics, and the like.

The halogenated Diels-Alder adducts in the present composition are desirably incorporated in the polymeric materials in an effective fire retardant amount. Generally, halogenated Diels-Alder adducts in the amount of from about 2 to about 50 percent by weight of the polymeric composition and desirably from about 5 to about 40 percent by weight of the polymeric composition and preferably from about 10 to 35 percent by weight are mixed with polymeric composition. Improved fire retardance can be provided by incorporating metallic compounds wherein the metal is selected from the group consisting of antimony, arsenic and bismuth, in the polymeric compositions in the amount of about 1 to about 30 percent by weight of said polymeric composition, preferably about 2 to 25 percent.

Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonious acids and their pentavalent derivatives. It is convenient to use sodium antimonite or potassium antimonite when it is desired to use an alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnamate, antimony anisate and their pentavalent dihalide derivatives. Likewise, the esters of antimonious acids and their pentavalent derivatives disclosed in U.S. Pat. No. 2,993,924 such as tris(n-octyl) antimonite, tris(2-ethylhexyl) antimonite, tribenzyl antimonite, tris(beta-chloroethyl) antimonite, tris(betachloropropyl) antimonite, tris(beta-chlorobutyl) antimonite and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed in particular the oxides of arsenic and bismuth.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer, e.g., from 70° to 600° centigrade. Alternatively, the additives and polymer are dryblended in the finely divided state so that an intimate mixture is obtained upon subsequent molding or extrusion.

The following examples are intended to illustrate the invention, but are not limited to limit the scope of the invention. In these examples, as well as in the specification and claims, parts and percentages are by weight and temperatures are given in degrees Centigrade unless otherwise specified.

EXAMPLE 1 Preparation of Diadduct of Bicyclononadiene

A. To 1230 grams (4.5 moles) of hexachlorocyclopentadiene which were heated to 150° centigrade were added over a period of 2 hours, 180 grams of bicyclo(4.3.0)nona-3,7-diene (1.5 moles) dissolved in 410 grams of hexachlorocyclopentadiene. The reaction mixture was heated at about 150° centigrade for 12 hours and then cooled to precipitate a solid product. About 752 grams of solid product were filtered off the reaction mixture and the solids were refluxed with xylene and filtered and washed with benzene to provide 542 grams or product having melting point of 338°–340° Centigrade.

B. To 1230 grams (4.5 moles) of hexachlorocyclopentadiene heated to 160° centigrade were added dropwise over a period of 2 hours a solution of 180 grams of bicyclo(4.3.0)nona-3,7-diene (1.5 moles) dissolved in 410 grams of hexachlorocyclopentadiene. The reaction mixture was heated at 160°–170° centigrade for 12 hours and then cooled to precipitate a solid product. The solid product was filtered from the reaction mixture and washed four times with 300 milliliters of acetone to provide 696 grams of a product having a melting point of 339°–342°C. The resulting 694 grams of product was refluxed with 500 milliliters of xylene for one hour, cooled, filtered and washed with xylene.

C. The product of Example 1 (B) was combined with the solid product of Example 1(A). The combined products were refluxed with xylene, cooled, filtered and washed with benzene to provide 912 grams of purified 1,2,3,4,6,7,8,9,12,12,13,13-dodecachloro-1,4,4a,4b,5,5a,6,9,9a,10,10a,11a-dodecahydro-1,4:6,9-dimethano-11 H-benzo(b) fluorene.

EXAMPLE 2

27 Parts of the diadduct of hexachlorocyclopentadiene and bicyclononadiene prepared as described in Example 1(C) were compounded with 13 parts of antimony trioxide and 60 parts of polypropylene and molded into test specimens which were subjected to tests for fire retardancy and mechanical properties. The results of these tests are shown in Table I, together with the results of similar tests made with the diadducts of hexachlorocyclopentadiene and dicyclopentadiene and 1,5-cyclooctadiene, respectively, and a control test with polypropylene alone. The test results show that the compound of the invention was superior with respect to heat deflection data.

EXAMPLE 3

18 Parts of the diadduct of hexachlorocyclopentadiene and bicyclononadiene prepared in Example 1 (C) were compounded with 6 parts of antimony trioxide and 76 parts of ABS polymer (Blendex 101) and molded into test specimens which were subjected to fire retardancy tests and mechanical tests and shown to have the properties set forth in Table.II. Also shown in Table II are the results of similar tests made with the diadducts of hexachlorocyclopentadiene and dicyclopentadiene and 1,5-cyclooctadiene, respectively, and control tests with ABS polymer alone.

The adduct compound of the invention is seen to be superior with respect to fire retardant efficiency and tensile strength.

EXAMPLE 4

Fifteen parts by weight of the diadduct of hexachlorocyclopentadiene and bicyclononadiene prepared in Example 1(C) were compounded with 5 parts of antimony trioxide and 80 parts of polystyrene and molded into test specimens which were subjected to tests for fire retardancy and mechanical properties. The results of these tests are shown in Table III together with the results of similar tests with respect to molded specimens of polystyrene containing the diadducts of hexachlorocyclopentadiene with dicyclopentadiene and 1,5-cyclooctadiene, respectively, and control tests with polystyrene alone.

The additive compound of the invention is seen to be superior with respect to afterglow properties and tensile strength and fluexural properties. The adduct of the invention is seen to be superior to the diadduct of 1,5-cyclooctadiene with respect to impact strength.

TABLE I

| Composition, Weight Percent | A | B | C | D |
|---|---|---|---|---|
| Polypropylene | 100 | 65 | 60 | 60 |
| Bicyclononadiene Diadduct | | | | 27 |
| Dicyclopentadiene Diadduct | | 25 | | |
| Cyclooctadiene Diadduct | | | 27 | |
| Antimony Trioxide | | 10 | 13 | 13 |
| Properties | | | | |
| Fire Retardance, ASTM D-635 | | | | |
| Flameout Time, sec. | Burns | 5.0 | 3.1 | 15.3 |
| Afterglow Time, sec. | | 86 | 92 | >52 |
| Drip | Yes | No | No | No |
| Notched Izod Sprue | 1.21 | 0.63 | 0.70 | .52 |
| Notched Izod Vent | .69 | 0.50 | 0.41 | .48 |
| Notched Izod Avg. | .95 | 0.56 | 0.56 | .50 |
| Tensile Yield PSI | 5330 | 4270 | 4070 | 4050 |
| Tensile Break PSI | 2300 | 3660 | 3720 | 3400 |
| Elongation at Yield % | 7.7 | 4.5 | 6.3 | 2.83 |
| Elongation at Break % | 45.0 | 16.0 | 21.5 | 22.0 |
| Flexural Yield PSI | 9290 | 7720 | 8120 | 7730 |
| Flexural Modulus PSI | $2.65 \times 10^5$ | $3.18 \times 10^5$ | $3.61 \times 10^5$ | $3.69 \times 10^5$ |
| Heat Deflection 66 PSI | 105.7 | 101.0 | 123.3 | 112.0 |
| Heat Deflection 264 PSI | 56.7 | 52.3 | 71.0 | 76.8 |
| Hardness Shore D | 78.0 | 82.0 | 77.2 | 80.2 |
| Hardness Rockwell L | 64.6 | 54.2 | 68.2 | 61.7 |
| Hardness Rockwell R | 103.8 | 96.8 | — | 97.4 |
| Thermal Stability | — | Good | Good | Good |
| Bloom | | | | No |

TABLE II

| Composition, Weight Percent | A | B | C | D |
|---|---|---|---|---|
| ABS | 100 | 70 | 70 | 76 |
| Bicyclononadiene Diadduct | | | | 18 |
| Dicyclopentadiene Diadduct | | 22 | | |
| Cyclooctadiene Diadduct | | | 22 | |
| Antimony Trioxide | | 8 | 8 | 6 |
| Properties | | | | |
| Fire Retardance, ASTM D-635 | | | | |

TABLE II-continued

|  |  |  |  |  |
|---|---|---|---|---|
| Flameout Time, sec. | Burns | <1 | 2.8 | 4.5 |
| Afterglow Time, sec. |  | 17 | 8.3 | 0 |
| Drip |  | No | No |  |
| Notched Izod Sprue | 8.10 | 1.09 | 0.71 | 1.39 |
| Notched Izod Vent | 6.75 | 1.08 | 0.60 | 1.48 |
| Notched Izod Avg. | 7.43 | 1.09 | 0.66 | 1.44 |
| Tensile Yield PSI | 5720 | 4650 | 4820 | 4880 |
| Tensile Break PSI | 4510 | 4400 | 4920 | 4382 |
| Elongation at Yield % | 4.2 | 3.3 | 2.6 | 3.2 |
| Elongation at Break % | 12.0 | 5.6 | 3.0 | 9.0 |
| Flexural Yield PSI | 9020 | 8250 | 9050 | 8300 |
| Flexural Modulus PSI | $2.50 \times 10^5$ | $2.59 \times 10^5$ | $3.27 \times 10^5$ | $2.84 \times 10^5$ |
| Heat Deflection 66 PSI | 91.5 | 93.5 | 91.5 | 90.0 |
| Heat Deflection 264 PSI | 79.7 | 80.8 | 81.2 | 77.3 |
| Hardness Shore D | 78.8 | 80.6 | 77.6 | 79.2 |
| Hardness Rockwell L | 39.4 | 28.2 | 39.6 | 21.5 |
| Hardness Rockwell R | 86.2 | 83.4 | Too hard | 78.8 |
| Thermal Stability |  |  |  |  |
| Bloom |  | No |  |  |

TABLE III

| Composition, Weight Percent | A | B | C | D |
|---|---|---|---|---|
| Polystyrene | 100 | 80 | 80 | 80 |
| Bicyclononadiene Diadduct |  |  |  | 15 |
| Dicyclopentadiene Diadduct |  | 15 |  |  |
| Cyclooctadiene Diadduct |  |  | 15 |  |
| Antimony Trioxide |  | 5 | 5 | 5 |
| Properties |  |  |  |  |
| Fire Retardance, ASTM D-635 |  |  |  |  |
| Flameout Time, sec. | Burns | 1.2 | 6.3 | 1.8 |
| Afterglow Time, sec. |  | 14 | 22 | 3.1 |
| Drip | Yes | No | No |  |
| Notched Izod Sprue | 1.063 | 0.55 | 0.41 | .58 |
| Notched Izod Vent | 0.517 | 0.40 | 0.37 | .36 |
| Notched Izod Avg. | 0.757 | 0.48 | 0.39 | .47 |
| Tensile Yield PSI | — | — | — | — |
| Tensile Break PSI | 7940 | 3150 | 5300 | 5990 |
| Elongation at Yield % | — | — | — | — |
| Elongation at Break % | 3.30 | 1.46 | 1.27 | 1.7 |
| Flexural Yield PSI | 16,730 | 11,460 | 11,070 | 12660 |
| Flexural Modulus PSI | $9.61 \times 10^5$ | $4.99 \times 10^5$ | $5.13 \times 10^5$ | $5.19 \times 10^5$ |
| Heat Deflection 66 PSI | 89.3 | 89.3 | 90.3 | 87.0 |
| Heat Deflection 264 PSI | 80.3 | 79.6 | 81.3 | 77.8 |
| Hardness Shore D | 84.6 | 90 | 86.2 | 91.4 |
| Hardness Rockwell L | 98.2 | 19.8 | 98.2 | 97.9 |
| Hardness Rockwell R | 121.8 | 98.2 | — | Too Hard |
| Thermal stability |  | Good | Good | Fair |
| Bloom |  | No | No |  |

Beneficial results are obtained by incorporating the diadduct of Example 1(C) in high impact rubber-modified polystyrene.

It will be apparent to those skilled in the art that many variations and modifications of the invention can be made without departing from the spirit and scope of the invention, the foregoing specification and examples are intended to be illustrative and not to limit the invention.

I claim:
1. A fire retardant polymeric composition comprising a polymer which is free of recurring carbonamide groups as an integral part of the main polymer chain and an effective fire retardant proportion of a compound of the formula:

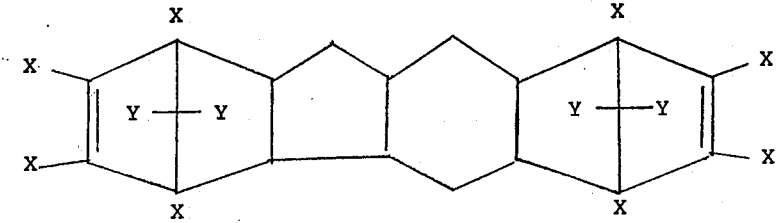

wherein X is selected from the group consisting of bromine, chlorine, and fluorine, Y is selected from the group consisting of bromine, chlorine, fluorine, alkyl of 1 to 10 carbon atoms, alkyloxy wherein the alkyl group contains 1 to 10 carbon atoms, haloalkyl and haloalkyloxy wherein the alkyl groups contain 1 to 10 carbon atoms and halo is fluoro, chloro, or bromo.

2. The composition of claim 1 wherein the compound of the formula is 1,2,3,4,6,7,8,12,12,13,13-dodecachloro-1,4,4a,4b,5,5a,6,9,9a,10,10a,11a-dodecahydro-1,4:6,9-dimethano-11 H-benzo(b) fluorene.

3. The composition of claim 1 wherein the compound of the formula is present in a proportion of about 2 to about 50 percent by weight of the polymer composition and wherein an antimony compound is present in a proportion of about 1 to about 30 percent by weight of the polymer composition.

4. The composition of claim 3 wherein the antimony compound is antimony oxide.

5. The composition of claim 1 wherein the polymer is polypropylene.

6. The composition of claim 1 wherein the polymer is polystyrene.

7. The composition of claim 1 wherein the polymer is rubber-modified polystyrene.

8. The composition of claim 1 wherein the polymer is a graft co-polymer of polybutadiene, styrene and acrylonitrile.

9. The composition of claim 1 wherein the polymer is a homopolymer or copolymer of an unsaturated hydrocarbon.

10. A fire retardant polymeric composition comprising a graft co-polymer of polybutadiene, styrene and acrylonitrile, about 10 to about 35 percent by weight of the polymeric composition of the Diels-Adler diadduct of hexachlorocyclopentadiene and bicyclononadiene, and about 2 to about 25 percent of antimony trioxide.

* * * * *

UNITED STATES PATENT OFFICE
CERTIFICATE OF CORRECTION

PATENT NO. : 3,976,722
DATED : August 24, 1976
INVENTOR(S) : Richard D. Carlson

It is certified that error appears in the above-identified patent and that said Letters Patent are hereby corrected as shown below:

At Column 8, line 50, for "8,12" read "8,9,12".

Signed and Sealed this

Seventh Day of June 1977

[SEAL]

Attest:

RUTH C. MASON
*Attesting Officer*

C. MARSHALL DANN
*Commissioner of Patents and Trademarks*